(12) United States Patent
Li

(10) Patent No.: US 7,543,191 B2
(45) Date of Patent: Jun. 2, 2009

(54) METHOD AND APPARATUS FOR ISOLATING BUS FAILURE

(75) Inventor: Yansong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/843,452

(22) Filed: Aug. 22, 2007

(65) Prior Publication Data

US 2008/0082866 A1    Apr. 3, 2008

(30) Foreign Application Priority Data

Sep. 29, 2006    (CN) .................... 2006 1 0062954

(51) Int. Cl.
*G06F 11/00* (2006.01)
(52) U.S. Cl. .................... 714/43; 710/100; 714/56
(58) Field of Classification Search .................. 714/43, 714/56

See application file for complete search history.

(56) References Cited

U.S. PATENT DOCUMENTS

| | | | | |
|---|---|---|---|---|
| 4,825,438 A | * | 4/1989 | Bennett et al. ................. | 714/56 |
| 5,682,551 A | * | 10/1997 | Pawlowski et al. ............ | 710/36 |
| 5,764,924 A | * | 6/1998 | Hong ......................... | 710/300 |
| 5,819,053 A | * | 10/1998 | Goodrum et al. ............ | 710/100 |
| 5,822,512 A | * | 10/1998 | Goodrum et al. .............. | 714/13 |
| 5,838,899 A | * | 11/1998 | Leavitt et al. ................. | 714/56 |
| 5,923,856 A | * | 7/1999 | Hazama et al. ............. | 710/300 |
| 6,463,554 B1 | * | 10/2002 | Budelman et al. ............. | 714/47 |
| 6,691,191 B1 | * | 2/2004 | Kobayashi et al. .......... | 710/107 |
| 6,996,750 B2 | * | 2/2006 | Tetreault ...................... | 714/44 |
| 7,069,477 B2 | * | 6/2006 | Bland et al. ................... | 714/43 |
| 2004/0117689 A1 | * | 6/2004 | Harper et al. ................. | 714/43 |
| 2007/0226547 A1 | * | 9/2007 | Takata et al. .................. | 714/48 |
| 2007/0240019 A1 | * | 10/2007 | Brady et al. .................. | 714/43 |

OTHER PUBLICATIONS

Shanley et al., "PCI System Architecture," Addison Wesley 4th Edition, 171-198, Reading (1999).

* cited by examiner

*Primary Examiner*—Scott T Baderman
*Assistant Examiner*—Kamini Patel
(74) *Attorney, Agent, or Firm*—Leydig, Voit & Mayer, Ltd.

(57) ABSTRACT

The embodiments of the present invention disclose a method for isolating a bus failure, which includes: acquiring, from a Compact PCI bus, an address of a target board being accessed; counting retry responses on the Compact PCI bus, wherein the retry responses are generated by access to the target board; sending a reset signal to the target board in response to that the times of the retry responses exceed a retry times threshold. With the embodiments of this invention, the normal operation of a failed device in the system may be restored in time, which may avoid that the bus is hanged up and is favorable for maintenance.

16 Claims, 4 Drawing Sheets

METHOD AND APPARATUS FOR ISOLATING BUS FAILURE

This application claims priority to Chinese Patent Application No. 200610062954.0, filed Sep. 29, 2006, which is hereby incorporated by reference.

FIELD OF THE INVENTION

The present invention relates to data transmission technologies, and particularly, to a method and apparatus for isolating a bus failure and a board.

BACKGROUND OF THE INVENTION

The Peripheral Component Interconnect (PCI) bus issued by Intel in 1992 has been applied widely because the PCI bus meets the increasing demands of multimedia computers for bus bandwidth. It has such advantages as Plug and Play, being independent of processors and good extensibility. It can also extend bus bandwidth or operation frequency as demanded and keep the compatibility of software.

Along with the development of the PCI bus in the personal computer field, it is gradually applied to other fields including the server field, the notebook computer field, and the embedded system field. In 1994, the PCI Industrial Computer Manufacturers Group (PICMG) issued the Compact PCI specification, and extended the PCI bus to other fields which require high reliability, such as the telecommunication field, the industry control field, etc. In the Compact PCI specification, a Compact PCI system adopts the mechanical size of a Eurocard and has the same electrical characteristics and data transmission protocols as the PCI bus protocol. The Compact PCI system also supports Hot-Plugging, i.e., the Compact PCI is able to replace a board in an on-line manner. Furthermore, the Compact PCI system has good extensibility, specifically, the Compact PCI system is able to configure boards, the number of which is changeable as demanded. Additionally, the Compact PCI system supports active and standby board switching so as to improve system reliability, and adopts chips mass-produced in the personal computer field and so as to reduce the cost.

A typical Compact PCI system with 8 slots is shown in FIG. 1. The Compact PCI system is a structure including front boards and back boards, in which the front boards provide general processing capabilities while the back boards provide interfaces to the outside. The front boards include a system board for implementing the management and control of the Compact PCI system and service boards for implementing service processing. The Compact PCI system has a bus topology structure, in which interaction between the system board and a service board and between two service boards may be implemented via a bus. However, when a certain board fails, it is difficult to isolate the failure of the board, which easily influences other boards and results in the failure of the whole Compact PCI system.

The communication process between two service boards connected to one Compact PCI bus is described as an example. A simplified schematic diagram of Service board 1 accessing Service board 2 is shown in FIG. 2. The CPU of Service board 1 initiates an access to the memory of Service board 2, access information of Service board 1 is transmitted to the Compact PCI bus through the host bridge and the PCI to PCI (P2P) bridge of Service board 1 and then transmitted to the P2P bridge of Service board 2. A simplified schematic diagram of Service board 2 responding to Service board 1 is shown in FIG. 3. The P2P bridge of Service board 2 responds to the access and transmits the access information to the PCI bus in Service board 2; the host bridge of Service board 2 responds to the access of the P2P bridge as a target device, receives the access information, and writes the access information to the memory or reads data from the memory and passes the data to the P2P bridge; then the P2P bridge passes response information of the CPU to the Compact PCI bus and the Compact PCI bus passes the response information to Service board 1. However, if Service board 2 fails, e.g., the host bridge operates abnormally, it cannot respond to the access of the P2P bridge. In this case, the P2P bridge of Service board 2 transmits a retry response to the P2P bridge of Service board 1 and then the P2P bridge of Service board 1 transmits a retry response to the host bridge of Service board 1. For host bridges in some boards, if they receive a retry response after initiating an access, they will attempt to access the target board unceasingly until accessing the target board successfully. In this case, the failure of Service board 2 influences Service board 1, and thus other functions, such as inter-board communication, to be implemented by the host bridge of Service board 1, cannot be implemented. Moreover, if a board encounters such an abnormal operation, the board cannot send a reset signal to a watchdog circuit, which will result in abnormal reset of the board. The board will be hung up without the watchdog circuit.

Therefore, how to solve the hang-up of the Compact PCI bus caused by a board failure has become a major issue. Because the failure of a certain board on the Compact PCI bus being extended to other boards is caused by characteristics of the host bridge chip, in a first conventional technical solution, some host bridge chips with a retry count function are used in boards, and specifically, a retry times threshold is predetermined via software. The host bridge gives up an unsuccessful operation and continues with another operation when the times of the retry response exceed the retry times threshold, which avoids the hang-up of the Compact PCI bus caused by repeated retry. In a second conventional technical solution, a circuit, the function of which is similar to that of the above host bridge chip, is used in a board to detect the retry response; the host bridge will be made to give up this access in some way if the times of the retry response exceeds a certain threshold, which may acquire the same effect as the first technical solution.

In a third conventional technical solution, i.e., a method and system for monitoring a system bus, an access module to be monitored and its corresponding monitoring period, an expiring event module and its corresponding operation are set in advance. The operation of modules exchanging information with each other on the system bus is monitored. The monitoring period is counted down when the modules start information exchange with each other; if the information exchange between the modules is completed before the monitoring period is counted down to zero, it is determined that the access module operates normally, otherwise, the expiring event is performed as a response for the access module.

In the above first technical solution, the count function of the host bridge chip is used to restore the normal operation of the board, which depends on the type of the selected host bridge chip. However, not all host bridge chips have the count function. The adaptability of the above second technical solution in which the function of the host bridge chip is replaced with a circuit is preferable, but it's not cost-saving compared to the first technical solution. In the third technical solution, certain function modules are used to perform the monitoring period and expiring operation set in advance, which may reflect abnormal status of the module to be monitored in real time. However, the preset operations corresponding to an expiring event only includes such functions as response, notification and failure record. These functions are only for monitoring instead of locating and eliminating the failure, so the third technical solution still has certain limitation. The above solutions only solve the problem of the hang-up of a board caused by a failure and restore the normal operation of the boards affected by the failure, but cannot locate the failed board and restore the normal operation of the failed board. The failed board may continuously affect other boards exchanging information with it.

SUMMARY OF THE INVENTION

The present invention provides a method and an apparatus for effectively isolating a bus failure so as to solve the problem that the failed board cannot be located and the normal operation of the failed board cannot be restored, and thus other boards are still affected by the failed board.

A method for isolating a bus failure includes:

acquiring, from a Compact PCI bus, an address of a target board being accessed;

counting retry responses on the Compact PCI bus, wherein the retry responses are generated by access to the target board;

sending a reset signal to the target board in response to that the times of the retry responses exceed a retry times threshold.

An apparatus for isolating a bus failure includes:

a PCI interface logic module, capable of acquiring, from a Compact PCI bus, an address of a target board being accessed;

a retry count module, capable of counting retry responses on the Compact PCI bus, wherein the retry responses are generated by access to the target board;

a decoding logic module, capable of sending a reset signal to the target board in response to that the times of the retry responses exceed a retry times threshold.

The embodiments of the present invention also provide a board, which includes a CPU, a memory, a host bridge chip and a PCI to PCI (P2P) bridge, the board further includes:

a monitoring unit, capable of acquiring, from a Compact PCI bus, an address of a target board being accessed, counting retry responses via the Compact PCI bus, wherein the retry response are generated by access to the target board, and sending a reset signal to the target board in response to that the times of the retry responses exceed a retry times threshold.

In the present invention, after determining that the times of the retry response of the target board exceed a predetermined retry times threshold, the monitoring units sends a reset signal to the target board to reset the target board so as to restore the normal operation of the target board, which may avoid that the failed target board affects other boards exchanging information with the target board, and thus other devices communicating with the target board is guaranteed not to be hanged up.

EMBODIMENTS OF THE INVENTION

In the Compact PCI bus protocol, a master device needs to send the address of a target board when data transmission starts, based on which, the embodiments of the present invention propose that a functional module is added to the system to locate the failed board and restore the normal operation of the failed board. The functional module monitors the operation on the bus in real time, acquires and stores the address of the target board, if the times of the retry response of a target board exceed a predefined threshold, generates a reset signal to the target board to make the target board operate normally.

The embodiments of the present invention are hereinafter described in detail with reference to the accompanying drawings.

Figure 1:
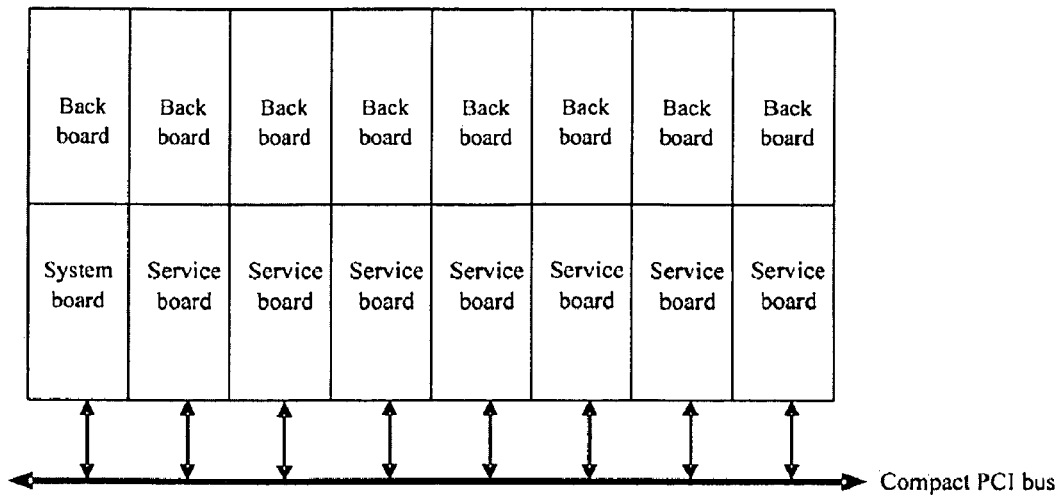
FIG. 1 shows a simplified schematic diagram illustrating a conventional Compact PCI system with 8 slots.
Figure 2:
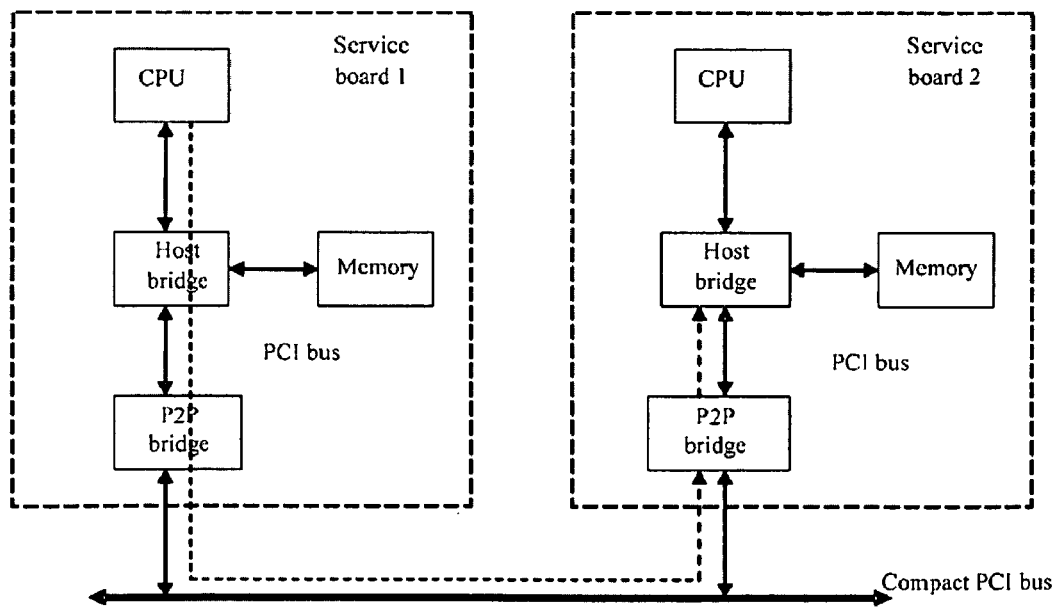
FIG. 2 shows a simplified schematic diagram illustrating a conventional process of Service board 1 initiating an access to Service board 2.
Figure 3:
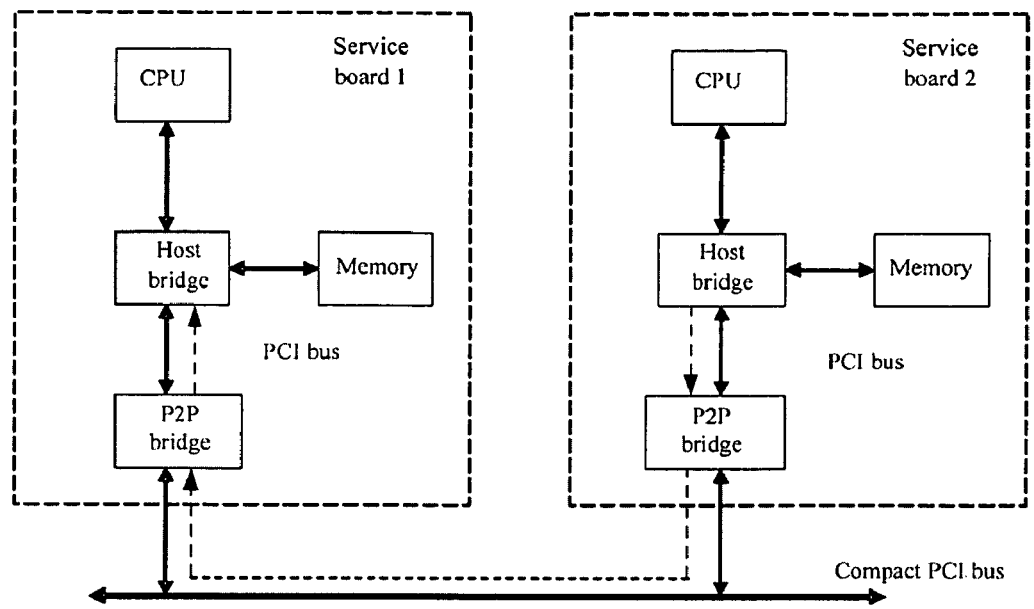
FIG. 3 shows a simplified schematic diagram illustrating a conventional process of Service board 2 responding to Service board 1.
Figure 4:
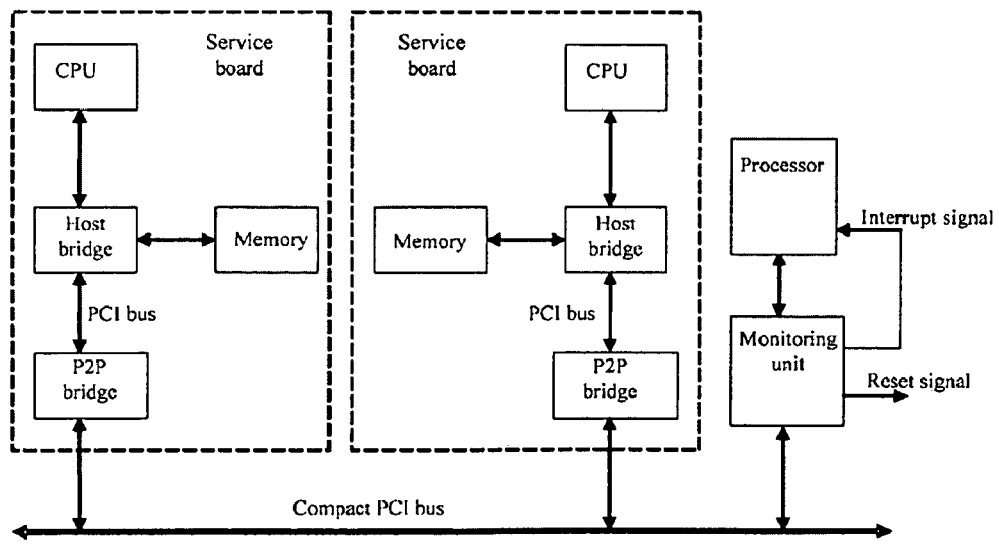
FIG. 4 shows a simplified schematic diagram illustrating a system for isolating a bus failure in accordance with an embodiment of the present invention.

FIG. 4 shows a simplified schematic diagram illustrating a system for isolating a bus failure in accordance with an embodiment of the present invention. In this embodiment, a monitoring unit is designed by means of programmable logic devices and is connected to a Compact PCI bus of the system. The system includes two service boards, one monitoring unit, one Compact PCI bus and one processor, and the Compact PCI bus makes the service boards connect with each other and each of the service boards connect to the monitoring unit. Each of the service boards includes a CPU, a memory, a host bridge and a P2P bridge, the CPU and the memory are connected to the host bridge respectively, and the host bridge and the P2P bridge are connected to each other through a PCI bus. The P2P bridge of each of the service boards is connected to the Compact PCI bus and is used for transmitting an access initiated by the CPU and the address of a target board. One end of the monitoring unit is connected to the Compact PCI bus, the other end is connected to the processor through an processor interface, and the monitoring unit is used for monitoring the operation on the Compact PCI bus in real time, acquiring and storing the address of the target board being accessed, counting retry response of the current access, and sending a reset signal and an interrupt signal for the target board to eliminate the failure of the target board when the times of the retry response reaches a retry times threshold. The processor is connected to the monitoring unit and is used for providing read and write operation for storing the address of the target board in the monitoring unit and predetermining the retry times threshold, reading the address of the target board based on the interrupt signal sent by the monitoring unit, and thus locating the failed board and sending a failure notification.

It should be noted, in this embodiment, only two service boards are connected to the Compact PCI bus and the monitoring unit is connected to each of the service boards through the Compact PCI bus as an independent module. In one embodiment, however, the system for isolating a bus failure provided by the present invention may include one or more boards, and the monitoring unit is not limited to a module independent of the boards and may also be configured in any board.

The monitoring unit used in the above system is hereinafter described in detail.

Figure 5:
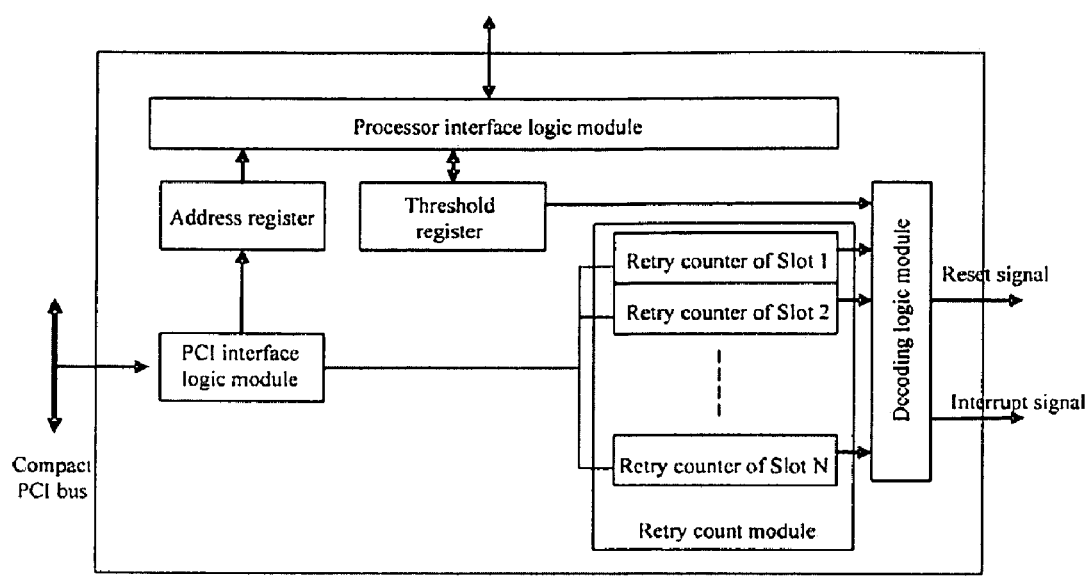
FIG. 5 shows a simplified schematic diagram illustrating a monitoring unit in FIG. 4 in accordance with an embodiment of the present invention.

FIG. 5 shows a simplified schematic diagram illustrating the monitoring unit in FIG. 4 in accordance with an embodiment of the present invention. As shown in FIG. 5, the monitoring unit is composed of a PCI interface logic module, a retry count module, a decoding logic module, an address register, a threshold register and a processor interface logic module.

One end of the PCI interface logic module is connected to the Compact PCI bus outside the monitoring unit to implement the connection between the monitoring unit and the Compact PCI bus, other ends of the PCI interface logic module are connected to the address register and the retry counter inside the monitoring unit respectively. The PCI interface logic module acquires the address of a target board from the Compact PCI bus, writes the address into the address register, determines whether a retry response is generated for the current access on the Compact PCI bus, and sends a determining result to the retry count module.

The retry count module is connected to the PCI interface logic module and includes at least one retry counter, and any of boards connected to the Compact PCI bus corresponds to at least one retry counter. The retry counter counts the retry response of a board corresponding to the retry counter or is reset when the retry response of the board terminates.

The decoding logic module is connected to the retry count module and is used for comparing a retry times threshold with the times of the retry response of the current access to determine whether the times of the retry response exceed the retry times threshold and generating a reset signal or further generating an interrupt signal based on the determining result.

The threshold register is connected to the decoding logic module and is used for storing a predetermined retry times threshold.

The address register is connected to the PCI interface logic module and is used for storing the address of the target board being accessed.

The processor interface logic module is connected to the address register and the threshold register and is used for providing a read and write interface for reading the address of the target board from the monitoring unit or reading and writing the retry times threshold.

The above monitoring unit may be configured in the system as an independent module. It is independent of the system and has universality in isolating and monitoring a failure in a Compact PCI bus system. Accordingly, the embodiments of the present invention also provide an apparatus for isolating a bus failure, and the monitoring unit in the above system may be deemed as an embodiment of the apparatus for isolating a bus failure when the apparatus is applied in the system.

The above monitoring unit may also be configured in any board in the system, and the board with the monitoring unit may isolate a bus failure in the system. Accordingly, the embodiments of the present invention also provide a board, in which the above monitoring unit connected to the Compact PCI bus is configured. The board with the monitoring unit may detect a failure in the system bus and reset the failed board. Meanwhile, a processor, which is used for processing an interrupt signal generated by the monitoring unit and generating a failure notification, may also be configured in the board. The processor may also be configured outside the board as long as it is connected to the monitoring unit.

According to the above system and apparatus, the method in accordance with an embodiment of the present invention is implemented as follows.

Step A: When a board initiates an access to a target board in the system, acquire the address of the target board from the Compact PCI bus.

Step B: Store the address of the target board into the address register; when the board initiating the access retries the access because of the abnormality of the target board, add one counting unit to the times of the retry response of the target board in the retry counter corresponding to the target board; when the times of the retry response in the retry counter reaches a threshold, generate a reset signal to reset the failed target board, and generate an interrupt signal and sends the interrupt signal to the processor; read the address from the address register, locate the failed target board, and send a failure notification to a maintenance personnel so as to replace the failed target board in time.

Figure 6:
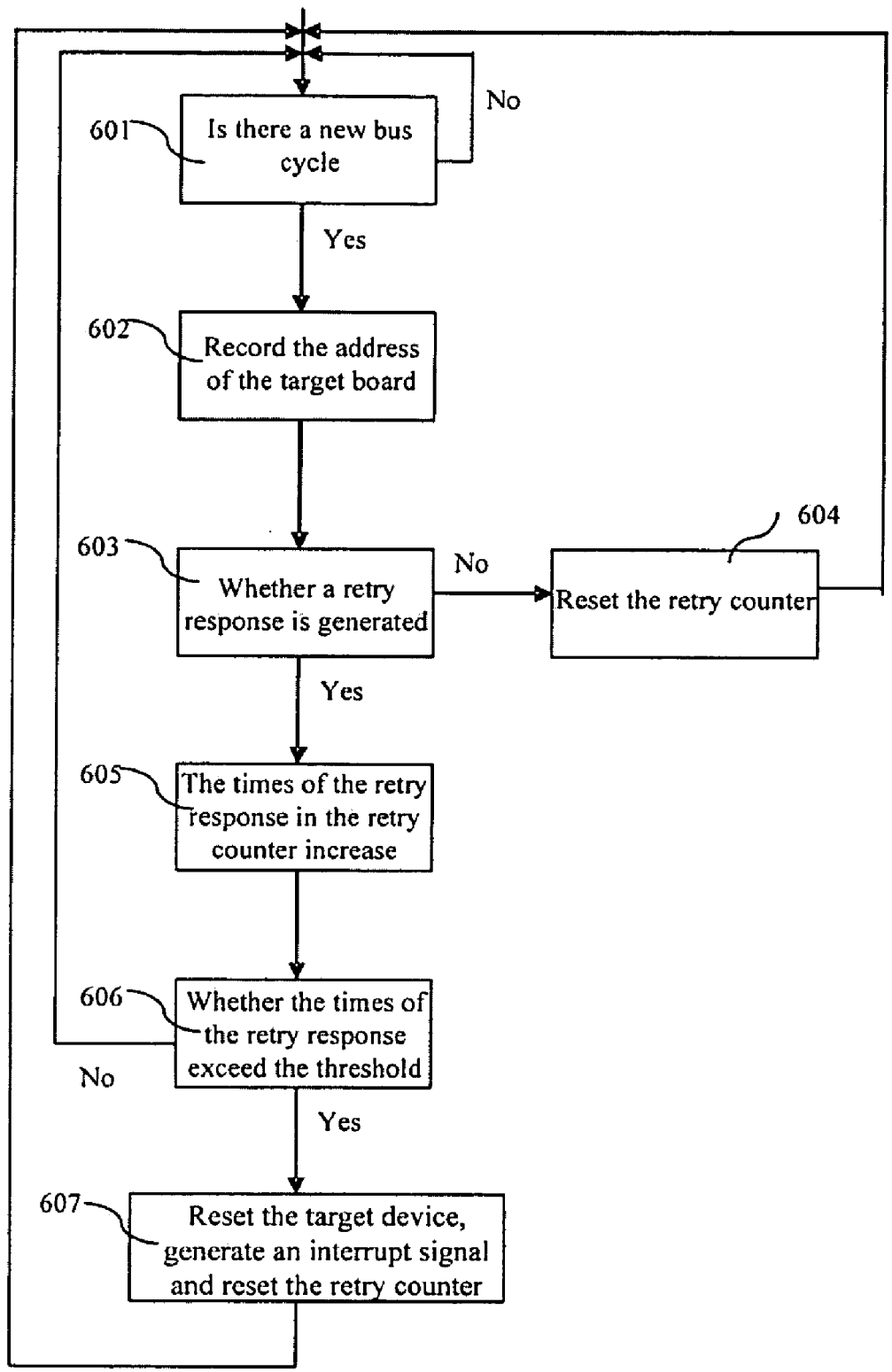
FIG. 6 shows a simplified schematic flow chart illustrating the operation of the monitoring unit in FIG. 5 in accordance with an embodiment of the present invention.

FIG. 6 shows a simplified flow chart illustrating the operation of the monitoring unit. As shown in FIG. 6, a detailed embodiment provided by the present invention, includes:

Block 601: The PCI interface logic module determines whether there is a new access to a target board on the Compact PCI bus, if yes, acquires the address of the target board transmitted on the Compact PCI bus.

Block 602: The PCI interface logic module writes the address of the target board into the address register and stores the address.

Block 603: The PCI interface logic module determines whether a retry response is generated for the current access, if yes, proceed to Block 605, otherwise, proceed to Block 604.

Block 604: The retry counter corresponding to the target board receives a reset signal sent by the PCI interface logic module and the retry counter is reset to zero, and return to Block 601.

Block 605: The retry counter corresponding to the target board receives an increment signal sent by the PCI interface logic module, the retry counter adds one counting unit to the times of retry response, and sends the times of the retry response to the decoding logic module.

Block 606: The decoding logic module acquires a retry times threshold from the threshold register, determines whether the times of the retry response exceed the retry times threshold, if yes, proceed to Block 607, otherwise, return to Block 601.

Block 607: The decoding logic module generates a reset signal and resets the target board and generates an interrupt signal to the outside, and the retry counter is reset.

In the above method, after the decoding logic module generates a reset signal and resets the failed target board, the normal operation of the failed target board is restored, and other boards initiating an access to the failed target board may also stop the retry access. Therefore, hang-up caused by the retry may be avoided on the Compact PCI bus. Moreover, the decoding logic module also generates an interrupt signal, which is acquired by the processor. The processor starts an interrupt service routine after acquiring the interrupt signal, reads the address of the target board being accessed from the address register and queries for the failed board corresponding to the address to determine which board fails, and thus sends a failure notification to the outside so as to notify the maintenance personnel to replace the board.

A detailed method application provided by an embodiment of the present invention is described to clarify the present invention clearer. Supposing that the addresses of boards 1 to 4 in the system are recorded as A, B, C and D respectively, the retry times threshold is 2, only board 2 fails, this method application includes the processes as follows.

Board 1 initiates an access to board 2, the PCI interface logic module in the monitoring unit stores the address B of board 2 into the address register and detects that a retry response is generated for the access initiated by board 1, so the times of the retry response in the retry counter corresponding to board 2 increase from 0 to 1, the decoding logic module acquires the retry times threshold 2, and the times of the retry response 1, and compares the retry times threshold with the times of the retry response and determines that the times of the retry response do not exceed the retry times threshold, and perform a second access.

The second access is initiated by board 3 to board 4, the content in the address register is updated with the address D of board 4 at this time, the PCI interface logic module detects that no retry response is generated for this access, so the retry counter corresponding to board 4 is reset, and perform a third access.

The third access is initiated by the board 1 to board 2, the content in the address register is updated from the address D of board 4 to the address B of board 2, the PCI interface logic module detects that a retry response is generated for this access, so the times of the retry response in the retry counter corresponding to board 2 increase from 1 to 2, the decoding logic module acquires the retry times threshold 2, and the times of the retry response 2, and compares the retry times threshold with the times of the retry response and determines that the times of the retry response do not exceed the retry times threshold, and perform a fourth access.

The fourth access is still initiated by the board 1 to board 2, the content in the address register is not updated, the PCI interface logic module detects that a retry response is generated for this access, so the times of the retry response in the retry counter corresponding to board 2 increase from 2 to 3, the decoding logic module acquires the retry times threshold 2 and the times of the retry response 3, compares the retry times threshold with the times of the retry response and determines that the times of the retry response exceed the retry times threshold, generates a reset signal and resets the failed board 2, and also generates an interrupt signal and reports the interrupt signal to the processor, the processor reads the address B from the address register, determines that board 2 fails, and sends a failure notification which indicates that board 2 is in failure to the outside, and then the maintenance personnel may replace board 2 in time based on the failure notification.

According to the systems and methods in accordance with the embodiments of the present invention, a failure in the system may be settled in time and the normal operation of the failed device is restored in time, and thus the failure does not affect other devices. Moreover, in the embodiments of the present invention, the failed device may be located and a failure notification may be sent to the outside to notify the maintenance personnel to replace the failed device in time. Thus, the failure in the system is isolated effectively.

The above is only preferred embodiments of the present invention and is not for use in limiting the protection scope thereof, and for those skilled in the art, there may be various modifications and changes to the present invention. Any modification, equivalent substitution, and improvement without departing from the spirit and principle of the present invention should be covered in the protection scope of the present invention.

What is claimed is:

1. A method for isolating a bus failure, applied to a system comprising a monitoring unit and multiple boards connected to a Compact PCI bus, wherein the monitoring unit comprises multiple retry counters, each of the multiple boards corresponds to one retry counter in the monitoring unit, and each retry counter corresponds to an address of a board, comprising:

monitoring, by the monitoring unit, the operation between the multiple boards;

when one of the multiple boards accesses another target board of the multiple boards, acquiring, by the monitoring unit, an address of the target board from the Compact PCI bus;

adding, by the monitoring unit, one counting unit to the retry counter corresponding to the address of the target board when each of the retry responses for the access to the target board is generated via the Compact PCI bus; and sending, by the monitoring unit, a reset signal to the target board in response to that the times of the retry responses exceed a retry times threshold.

2. The method of claim 1, further comprising:
resetting, by the monitoring unit, the retry counter corresponding to the address of the target board if the retry response is not generated via the Compact PCI bus.

3. The method of claim 1, further comprising:
resetting, by the monitoring unit, the retry counter corresponding to the address of the target board when the access to the target board succeeds.

4. The method of claim 1, further comprising:
storing, by the monitoring unit, the address of the target board.

5. The method of claim 1, further comprising:
generating, by the monitoring unit, an interrupt signal in response to that the times of the retry responses in the retry counter exceed the retry times threshold.

6. The method of claim 5, further comprising:
determining, by the monitoring unit, location information of the target board according to the address of the target board after receiving the interrupt signal, and outputting a failure notification containing the location information of the target board.

7. An apparatus for isolating a bus failure, comprising:
a PCI interface logic module, capable of monitoring the operation between multiple boards connected to a Compact PCI bus, and when one of the multiple boards accesses another target board of the multiple boards, acquiring an address of the target board from the Compact PCI bus;
a retry count module, comprising multiple retry counters, wherein each of the multiple boards corresponds to one retry counter and each retry counter corresponds to an address of a board, the retry counter module capable of determining a retry counter corresponding to the address of the target board, and adding one counting unit to the retry counter corresponding to the address of the target board when each of the retry responses for the access to the target board is generated via the Compact PCI bus; and
a decoding logic module, capable of sending a reset signal to the target board in response to that the times of the retry responses exceed a retry times threshold.

8. The apparatus of claim 7, further comprising:
a threshold register connected to the decoding logic module, capable of storing the retry times threshold.

9. The apparatus of claim 8, further comprising:
an address register, capable of storing the address of the target board received from the PCI interface logic module.

10. The apparatus of claim 9, further comprising:
a processor interface logic module, connected to the address register and the threshold register, wherein a processor performs at least one of reading the address of the target board and writing the retry times threshold through the processor interface logic module.

11. The apparatus of claim 7, wherein the decoding logic module further comprises an interrupt signal generating module capable of generating an interrupt signal and sending the interrupt signal to a processor in response to that the times of the retry responses exceed the retry times threshold.

12. The apparatus of claim 7, wherein the retry counter corresponding to the address of the target board is reset when the access to the target board succeeds.

13. A board, comprising a CPU, wherein the board further comprises:
- a monitoring unit, capable of monitoring the operation between multiple boards connected to a Compact PCI bus, and when one of the multiple boards accesses another target board of the multiple boards, acquiring an address of the target board from the Compact PCI bus; the monitoring unit comprising multiple retry counters, wherein each of the multiple boards corresponds to one retry counter and each retry counter corresponds to an address of a board, and capable of determining a retry counter corresponding to the address of the target board, and adding one counting unit to the retry counter corresponding to the address of the target board when each of the retry responses for the access to the target board is generated via the Compact PCI bus; and capable of sending a reset signal to the target board in response to that the times of the retry responses exceed a retry times threshold, wherein the board comprising the monitoring unit is independent of the target board and the board accessing the target board.

14. The board of claim 13, wherein the monitoring unit comprises:
- a PCI interface logic module, capable of monitoring the operation between the multiple boards connected to the Compact PCI bus, and when one of the multiple boards accesses another target board of the multiple boards, acquiring the address of the target board from the Compact PCI bus;
- a retry count module connected to the PCI interface logic module, comprising multiple retry counters, wherein each of the multiple boards corresponds to one retry counter and each retry counter corresponds to an address of a board, the retry count module capable of determining a retry counter corresponding to the address of the target board, and adding one counting unit to the retry counter corresponding to the address of the target board when each of the retry responses for the access to the target board is generated via the Compact PCI bus; and
- a decoding logic module connected to the retry counting module, capable of sending the reset signal to the board in response to that the times of the retry response exceed the retry times threshold.

15. The board of claim 14, wherein the decoding logic module further comprises an interrupt signal generating module capable of generating an interrupt signal and sending the interrupt signal to a processor when the times of the retry response exceed the retry times threshold.

16. The board of claim 15, further comprising:
- a processor, capable of receiving the interrupt signal sent by the interrupt signal generating module, reading the address of the target board, determining location information of the target board according to the address of the target board, and outputting a failure notification containing the location information of the target board.

* * * * *